United States Patent
Rifai et al.

(10) Patent No.: US 11,906,820 B2
(45) Date of Patent: *Feb. 20, 2024

(54) SPECTACLE LENS AND A METHOD FOR PRODUCING A SPECTACLE LENS

(71) Applicant: Carl Zeiss Vision International GmbH, Aalen (DE)

(72) Inventors: Katharina Rifai, Tübingen (DE); Siegfried Wahl, Donzdorf (DE); Timo Kratzer, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,053

(22) Filed: Mar. 28, 2023

(65) Prior Publication Data

US 2023/0236438 A1 Jul. 27, 2023

Related U.S. Application Data

(60) Division of application No. 18/166,064, filed on Feb. 8, 2023, now Pat. No. 11,809,023, which is a
(Continued)

(30) Foreign Application Priority Data

Aug. 10, 2020 (EP) ..................................... 20190303

(51) Int. Cl.
*G02C 7/02* (2006.01)
*G02C 13/00* (2006.01)

(52) U.S. Cl.
CPC ........... *G02C 7/027* (2013.01); *G02C 13/003* (2013.01); *G02C 2202/20* (2013.01)

(58) Field of Classification Search
CPC .. C02C 7/021; C02C 7/24; C02C 7/27; C03C 1/00; C03C 4/04; G02C 2202/20; G02C 2202/04; G02C 2202/14; G02C 13/003
(Continued)

(56) References Cited

U.S. PATENT DOCUMENTS

| 4,368,979 A | 1/1983 | Ruell |
| 6,020,983 A | 2/2000 | Neu et al. |

(Continued)

FOREIGN PATENT DOCUMENTS

| AU | 2013100172 A4 | 3/2013 |
| DE | 10 2009 004 377 A1 | 7/2010 |

(Continued)

OTHER PUBLICATIONS

Thibos et al., "Power Vectors: An Application of Fourier Analysis to the Description and Statistical Analysis of Refractive Error," Optometry and Vision Science, vol. 74, No. 6, pp. 367 to 375, 1997.
(Continued)

*Primary Examiner* — Travis S Fissel
(74) *Attorney, Agent, or Firm* — Tautz & Schuhmacher LLC; Georg Hasselmann

(57) ABSTRACT

A spectacle lens for at least one eye of a user, a method for producing a spectacle lens, and a computer program product having executable instructions for performing the method for producing the spectacle lens are disclosed. The spectacle lens has a permanent marking which is or contains a diffractive structure, wherein a diffractive pattern generated by illumination of the diffractive structure is configured to be invisible upon a first kind of illumination and configured to be visible only upon a second kind of illumination. The permanent markings on the spectacle lens are, on one hand, invisible to the user or to a spectator looking at the user wearing the spectacle lens without utilizing specially
(Continued)

selected optical aids but, on the other hand, enables continued control of the spectacle lens in front of the eye of the user by an optician or a specifically designated optical sensor.

26 Claims, 1 Drawing Sheet

Related U.S. Application Data continuation of application No. PCT/EP2021/072138, filed on Aug. 9, 2021.

(58) Field of Classification Search
USPC .............. 351/159.76, 159.69, 159.8, 159.81
See application file for complete search history.

(56) References Cited

U.S. PATENT DOCUMENTS

| | | |
|---|---|---|
| 2009/0302122 A1 | 12/2009 | Begon |
| 2015/0029459 A1 | 1/2015 | Tabirian et al. |
| 2017/0261765 A1 | 9/2017 | Dangelmaier et al. |
| 2019/0231517 A1 | 8/2019 | Gengler et al. |

FOREIGN PATENT DOCUMENTS

| | | |
|---|---|---|
| DE | 10 2015 109 703 A1 | 12/2016 |
| DE | 10 2018 125 092 A1 | 4/2020 |
| EP | 3332947 A1 | 6/2018 |
| EP | 3382445 A1 | 10/2018 |
| WO | 2014169323 A1 | 10/2014 |
| WO | 2015177370 A1 | 11/2015 |

OTHER PUBLICATIONS

Internet citation "The Lens Marking Guidelines," Version 2.0, Jun. 2014, developed by Lens Division of The Vision Council, Lens Marking Task Force, The Vision Council, 225 Reinekers Lane Suite 700, Alexandria, VA 22314, thevisioncouncil.org, last accessed Feb. 7, 2023.

Sliney, "What is light? The visible spectrum and beyond," EYE, vol. 30, No. 2, pp. 222 to 229, Jan. 2016.

Trapp et al., "Design of a 2 diopter holographic progressive lens," Optics Express, vol. 26, No. 25, pp. 32866 to 32877, Dec. 2018.

Trapp et al., "Hybrid refractive holographic single vision spectacle lenses," Journal of the European Optical Society-Rapid Publications, vol. 15, No. 1, pp. 1 to 8, Jun. 2019.

Industrial Norm "Ophthalmic optics—Spectacle lenses—Vocabulary (ISO 13666:2019)," English version EN ISO ISO 13666:2019, Dec. 2019.

European Search Report issued in EP 20 190 303.6 to which this application claims priority of, dated Feb. 5, 2021.

International Search Report and Written Opinion issued in PCT/EP2021/072138 to which this application claims priority of, dated Feb. 9, 2022.

International Preliminary Report on Patentability issued in PCT/EP2021/072138 to which this application claims priority of, dated Nov. 28, 2022.

Trapp et al., "Holographic Progressive Lenses," SPIE Optical Engineering + Applications, Proc. 10745, pp. 1-7, Sep. 2018.

ial application of U.S. patent application Ser. No. 18/166,064, filed on Feb. 8, 2023 which is a continuation application of international patent application PCT/EP2021/072138, filed on Aug. 9, 2021 and designating the U.S., which claims priority to European patent application EP 20 190 303.6, filed on Aug. 10, 2020, all of which are hereby incorporated by reference in their entireties.

TECHNICAL FIELD

The present disclosure relates to a spectacle lens for at least one eye of a user, a method for producing a spectacle lens, and a computer program product comprising executable instructions for performing a method for producing a spectacle lens.

BACKGROUND

Spectacle lenses for at least one eye of a user and methods for producing spectacle lenses are known. Generally speaking, the term "spectacle lens" refers to an optical lens which is, typically, used for correcting at least one ocular aberration of the at the least one eye of the user. As generally used, the term "ocular aberration" refers to a difference between a surface of an ideal optical wavefront and a surface of an actual optical wavefront which is determined for the at least one eye of a user. Herein, the term "optical wavefront" relates to a surface which is perpendicular to a ray along which light propagates. Within a typical human population, the ocular aberration, usually, comprises at least one second-order spherocylindrical focus error, also denoted as "refractive error," wherein, however, at last one higher-order aberration may also occur.

However, in order to achieve an adequate correction of the at least one refractive error an accurate positioning of the at least one spectacle lens in front of the at least one eye of the user is required. This observation is applicable for at least one single vison lens but especially for at least one progressive-power lens whose acceptance by a user critically depends on an accurate positioning thereof in front of the at least one eyes of the user. For this purpose, an optician, typically, utilizes a specifically adapted centration device which is configured for determining the accurate positions of the at least one spectacle lens within a spectacle frame which is designated for receiving the at least one spectacle lens.

Until the user, eventually, wears the spectacles comprising the at least one single vison lens or the at least one progressive-power lenses, various processing steps are performed which may, however, be prone to error. As a result, although the at least one single vison lens or the at least one progressive-power lens may have correctly been designed to accurately correct the refractive error of the at least one eye of the user, an inaccurate positioning in front of the at least one eye of the user may, still, lead to a suboptimal vision by the user when wearing the spectacles. Herein, the processing steps prone to error may, in particular, comprise grinding of the at least one spectacle lens and adjusting the spectacle frame to the head of the user.

In order to be able to control a position of the at least one spectacle lens, especially the at least one single vison lens or the at least one progressive-power lens, in front of the at least one eye of the user, the at least one spectacle lens, usually, comprises removable lens markings which are designed to enable a continued control of the position of the at least one spectacle lens in front of the at least one eye by the optician prior to issuing the spectacles to the user. Subsequently, the optician, usually, removes the lens markings before the user leaves the premises, thereby wearing the spectacles that comprise the at least one single vison lens or the at least one progressive-power lens. However, in an event in which the user may return to the premises of the optician, hereby objecting a suboptimal vision as a result of wearing the new eye glasses, a control of the positioning of the spectacles in front of the at least one eye of the user is no longer possible, in particular due to the preceding removal of the lens markings which is, particularly, advantageous for the vison of the user and the esthetic appearance of the spectacles. In this event, the optician is, by way of example, no longer able to detect whether the user wears the spectacles inaccurately since the spectacle frame may be out of shape.

The Lens Marking Guidelines, Version 2.0, June 2014, Developed by Lens Division of The Vision Council, Lens Marking Task Force, The Vision Council, 225 Reinekers Lane Suite 700, Alexandria, VA 22314, thevisioncouncil.org, (retrieved May 11, 2020) disclose recommendations for temporary lens markings as well as for permanent lens markings, wherein removable markings on the spectacle lens which are typically non-permanent ink markings and removed prior to wear by an optician are often utilized to position the spectacle lens during layout blocking and to verify the power and position of the spectacle lens during inspection and dispensing, whereas irremovable markings on the spectacle lens that are typically engraved markings and either located on an unusable area of the lens blank or only minimally visible to observers are often utilized to identify the brand and addition power of the spectacle lens, if applicable, and to provide reference points for reapplying temporary markings. In particular, no permanent markings which could impair the visual function of the lens should appear within a 30 mm exclusion zone located around a prism reference point (PRP).

DE 10 2009 004 377 A1 discloses introducing a permanent structure into a spectacle lens which is produced by 3D printing. For this purpose, a partial volume of the spectacle lens which is configured for carrying the permanent structure comprises a solvable material. As an alternative, the partial volume comprises a material having a different refractive index compared to the remaining material of the spectacle lens.

WO 2015/177370 A1 discloses a spectacle lens for a user which includes a lens body which is at least partly transparent to incident light and has a phase object which guides the light incident at an angle of incidence on a side facing away from a user into a direction depending on the wavelength of the light and the angle of incidence. The phase object has a multiplicity of diffraction structures which diffract monochromatic light at a wavelength of 380 nm to 800 nm with a diffraction efficiency of at least 70% into one and same order of diffraction when the monochromatic light is incident at the angle of incidence on the side of the lens facing away from the user which lies within a diffraction structure specific angle interval 15° wide and dependent on the wavelength of the light.

Further holographic progressive-power lenses are disclosed by Jannik M. Trapp, Manuel Decker, Jörg Petschulat, Thomas Pertsch, Toufic G. Jabbour, *Holographic progres-*

*sive lenses*, Proc. SPIE 10745, Current Developments in Lens Design and Optical Engineering XIX, 107450G (2018); by Jannik M. Trapp, Manuel Decker, Jörg Petschulat, Thomas Pertsch, Toufic G. Jabbour, *Design of a 2 diopter holographic progressive lens*, Optics Express 26 (25), 2018, 32866; and by Jannik M. Trapp, Toufic G. Jabbour, Gerhard Kelch, Thomas Pertsch and Manuel Decker, *Hybrid refractive holographic single vision spectacle lenses*, Journal of the European Optical Society-Rapid Publications (2019) 15:14.

US 2017/0261765 A1 discloses storing information in an optical element in the form of a glass or plastic body embodied as spectacles lens, spectacles lens blank or spectacles lens semi-finished product. The information in the form of data is stored on or in the glass or plastic body by creating at least one marking with a marking system. The marking can be read by a reading apparatus. The marking system has an interface for reading information individualizing the optical element. The marking is created permanently by the marking system on or in the optical element at a definition point of a local body-specific coordinate system set by two points on or in the optical element. In this body coordinate system, the manufacturer specifies the position of the lens horizontal and/or the far and/or the near and/or the prism reference point.

US 2019/0231517 A1 discloses a lens including a posterior surface, an anterior surface, and at least one identification marking on the lens. The at least one identification marking exhibits a first degree of visibility in an ambient lighting condition and a second degree of visibility greater than the first degree of visibility in a lighting condition different than the ambient lighting condition.

US 2009/0302122 A1 discloses a method for recording data on an optical lens consisting in recording a data-containing source image, in generating a hologram of the image source and in recording said hologram on the lens surface portion ranging from 0.5 mm² to 15 mm². The data can be read-out by illuminating said lens by means of a light beam in the hologram area. A read-out image which reproduces the source image and on which data is readable is formed at a distance from the lens. Said lens can be embodied, in particular in the form of an ophthalmic lens.

US 2015/0029459 A1 discloses an ophthalmic lens incorporating clearly identifiable, highly visible embedded labels that are not visible to the wearer or others when placed on the eye that may be utilized to allow an individual to easily distinguish between the normal state of the lens and the inverted state of the lens as well as serve any number of functions, including acting as a brand label, a prescription label or as a cosmetic enhancer. The embedded label comprises holographic recordings revealed only in transmitted light.

SUMMARY

In particular with respect to the disclosure of the Lens Marking Guidelines, see above, it is therefore an objective of the present disclosure to provide a spectacle lens for at least one eye of a user, a method for producing a spectacle lens, and a computer program product comprising executable instructions for performing a method for producing a spectacle lens, which at least partially overcome the above-mentioned problems of the related art.

It is a particular objective of the present disclosure to introduce permanent markings on the spectacle lens which may not be visible to the user or to a spectator looking at the user wearing the at least one spectacle lens without utilizing specially selected optical aids.

More particular, it would be desirable that the permanent markings on the spectacle lens, on a single vison lens or, especially, on a progressive-power lens, are designed for enabling a continued control of the position of the at least one spectacle lens in front of the at least one eye of the user by the optician and/or the specifically designated optical sensor.

This problem is solved by a spectacle lens for at least one eye of a user, a method for producing a spectacle lens, and a computer program product comprising executable instructions for performing a method for producing a spectacle lens having a diffractive structure for generating a diffractive pattern being invisible under a first illumination and being visible under a second illumination. Exemplary embodiments, which can be implemented in an isolated fashion or in any arbitrary combination, are discussed in detail below.

As used in the following, the terms "have," "comprise" or "include" or any arbitrary grammatical variations thereof are used in a non-exclusive way. Thus, these terms may refer to both a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably," "more preferably," "particularly," "more particularly," or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in this way with other features of the disclosure.

In a first aspect, the present disclosure relates to a spectacle lens for at least one eye of a user. Instead of the term "user," a different term, such as "subject," "person," "test person" or "wearer of spectacles," may also be applicable.

In accordance with the present disclosure, the spectacle lens for at least one eye of a user has a lens body comprising at least one permanent marking, wherein the at least one permanent marking is or comprises at least one diffractive structure.

Based on standard ISO 13666:2019, also referred to herein as the "Standard," Section 3.5.2, the term "spectacle lens" relates to an optical lens which is used for determining and/or correcting the at least one ocular aberration of at least one eye of a user, wherein the spectacle lens is carried in front of the eye of the user. Further, based on the Standard, Section 3.7.8, the terms "progressive-power lens," "progressive-addition lens," and "varifocal lens" refer to a particular kind of spectacle lens being a power-variation lens having two reference points for focal power, generally designed to provide correction for presbyopia and clear vision from distance to near. In particular, the progressive-power lens has a primary reference point also denoted as "distance reference point" and a secondary reference point also denoted as "near reference point." Further, the term "spectacles" refers to an arbitrary element which comprises two individual spectacle lenses and a spectacle frame, such as "eye glasses," wherein each spectacle lens is prepared for being received by the spectacle frame selected by the user.

As further indicated above, the term "ocular aberration" refers to a difference between a surface of an ideal optical wavefront and a surface of an actual optical wavefront which is determined for the at least one eye of a user. Herein, the term "optical wavefront" relates to a surface which is perpendicular to a ray along which light propagates. In particular, the ocular aberration within a typical human population, usually, comprises at least one second-order spherocylindrical focus error, also denoted as "refractive error." For describing a spherocylindrical lens which is designed for correcting a spherocylindrical focus error, various approaches are possible. As defined in the standard, Section 3.6.6, the term "spherocylindrical lens" refers to a spectacle lens having a spherical surface and a cylindrical surface. Further, the spherocylindrical lens is defined, according to Section 3.13.1, as a spectacle lens which combines a paraxial, parallel beam of light in two individual, mutually perpendicular focal lines, whereby the spectacle lens has an apex refractive power only in two meridians. Further, the term "apex refractive power" is, according to Section 3.10.7, defined as a reciprocal value of the width of the paraxial section. As further defined in Section 3.2.12 and 3.13.2, the term "meridian" relates to one of two perpendicular planes of the spectacle lens having an astigmatic effect being parallel to the two focal lines. Herein, the term "astigmatic effect" corresponds to an "astigmatic difference" which is defined in Section 3.13.6 as a difference between the value of the apex refractive power in the second meridian and the value of the apex refractive power in the first meridian. Further, the "cylindrical power" refers, according to Section 3.13.7, to an algebraic difference between the refractive values of the meridians, wherein the refractive value of a particular meridian being used as a reference is subtracted from the refractive value of the other meridian, while the "cylinder axis" indicates according to Section 3.13.8 the direction of the meridian of the spectacle lens whose apex refractive index is used as the reference.

As an alternative, L. N. Thibos, W. Wheeler and D. Homer (1997), *Power Vectors: An Application of Fourier Analysis to the Description and Statistical Analysis of Refractive Error*, Optometry and Vision Science 74 (6), S. 367-375, propose to approach the description of a spherocylindrical lens from a viewpoint of Fourier analysis of a power profile. They show that the familiar sine-squared law leads naturally to a Fourier series representation with exactly three Fourier coefficients, representing natural parameters of a thin lens. Herein, a constant term corresponds to a mean spherical equivalent (MSE) power, whereas amplitude and phase of the harmonic correspond to the power and axis of a Jackson cross-cylinder (JCC) lens, respectively. Expressing the Fourier series in rectangular form leads to the representation of an arbitrary spherocylindrical lens as sum of a spherical lens and two cross-cylinders, one at axis 0° and the other at axis 45°. The power of these three component lenses may be interpreted as (x, y, z) coordinates of a vector representation of the power profile. The power vector representation of a spherocylindrical lens can be used for numerical and graphical analysis of optometric data for problems involving lens combinations, comparison of different lenses, and statistical distribution of refractive errors.

As indicated above, the spectacle lens for the at least one eye of the user has a lens body. As generally used, the term "lens body" refers to a three-dimensional object which comprises the spectacle lens. For a purpose of a spectacle lens which is designated for receiving incident light, modifying an optical path of the incident light and emitting the modified incident light to the at least one eye of the user, the lens body may be transparent or at least partly transparent to the incident light. As generally used, the "transparency" refers to a property of the lens body related to a capability of transporting a portion of the incident light through the lens body, wherein the portion may be 100% (transparent) or less but above 0% (partially transparent), depending on a desired attenuation of the incident light by the lens body. For this purpose, the lens body comprises at least one transparent or a semi-transparent material, in particular selected from glass, quartz or a suitable solid organic substance.

Further, the lens body comprises at least one permanent marking. As generally used, the term "permanent marking" refers to a marking introduced into the lens body which cannot be removed without exertion of a considerable force which would damage the spectacle lens. Hereby, the term "permanent marking" is, particularly, to be viewed in contrast to a temporary markings which, typically, comprises non-permanent ink and can, thus, easily, be removed prior to wear by an optician applying a soft force not being sufficient to damage the spectacle lens. In particular, the permanent marking which comprises at least one diffractive pattern as described below in more detail may be a volume element which is comprised by the lens body but which occupies at maximum 2%, preferably 1%, more preferred 0.5% of a volume of the lens body. Owing to the transparency or to the partial transparency of the lens body, the permanent marking can, in principle, be placed at any location within the lens body or at or below a surface of the lens body.

Further, the at least one permanent marking may, preferably, be configured to provide information such as at least one of a location on the lens body, an item of information related to the spectacle lens, or an item of information related to the at least one eye of the user. Particularly, the at least one permanent marking is configured to provide information about at least one of a location on the lens body. As generally used, the term "location" refers to a two-dimensional position on a surface of the lens body or a three-dimensional position within the lens body. In particular for a purpose of being able to control a position of the at least one spectacle lens in front of the at least one eye of the user by the optician and/or a specifically designated optical sensor, the information about the at least one location on the lens body may, preferably, be selected from at least one of:

a distance reference point (DRP);
at least one near reference point (NRP);
a fitting cross (FC);
a prism reference point (PRP);
an alignment reference marking.

However, further kind of locations about which information may be provided by the at least one permanent marking as comprised by the lens body may be feasible.

As indicated above, the "distance reference point" is the primary reference point comprised by the progressive-power lens, whereas the "near reference point" is the secondary reference point comprised by the progressive-power lens. Further, the "fitting cross" (FC) indicates a location on the spectacle lens which is used as a reference point for positioning the lens in front of the user's eye which coincides with the "layout reference point" (LRP) for the progressive-power lens. Further, the "prism reference point" (PRP) refers to a position on the spectacle lens at which a prism value of the finished spectacle lens is to be measured, wherein, the prism reference point is located on the progressive-power lens at a midpoint between an "alignment reference marking," separated by a distance of 34 mm, along a horizontal axis bisecting those two markings.

Alternatively or in addition, the at least one permanent marking may comprise information about the item of information related to the spectacle lens which may, preferably, be selected from at least one of:
a power of the spectacle lens;
a type of the spectacle lens;
an identifier of the spectacle lens, in particular, selected from at least one of a unique identifier (UID), a unique device identifier (UDI) with UDI-DI (device identifier) or UDI-PI (production identifier), or a proprietary identifier;
a manufacturer of the spectacle lens;
a supplier of the spectacle lens;
a tradename related to the spectacle lens;
or a trademark related to the spectacle lens.
However, further items of information related to the spectacle lens may be comprised by the at least one permanent marking.

As indicated above, the term "power" is indicative of a strength of a correction of at least one ocular aberration by the spectacle lens, such as an apex refractive power. Further, the term "type" refers to at least one specification being related to at least one of a material, a production method, or a treatment of the spectacle lens. Further, the terms "manufacturer" and "supplier" indicate commercial properties related to production and distribution of the spectacle lens, while the terms "tradename" and "trademark" indicate further trade-related properties of the spectacle lens.

Alternatively or in addition, the at least one permanent marking may comprise information about the item of information related to the at least one eye of the user which may, preferably, be selected from at least one of:
an ocular aberration, in particular at least one refractive error;
a direction of view;
a corneal vertex distance; or
a pupillary distance.
However, further items of information related to the at least one eye of the user may be comprised by the at least one permanent marking.

In particular accordance with the present disclosure, the at least one permanent marking is or comprises at least one diffractive structure. As generally used, the term "diffractive structure" refers to a two-dimensional structure on a surface of the lens body or a three-dimensional structure within the lens body, wherein the structure is configured to generate a diffractive pattern provided that an incident light beam impinges on the diffractive structure under at least one specified condition. Thus, as further generally used, the term "diffractive pattern" relates to an optically visible phenomenon which is generated by modifying an optical wavefront upon contact with the diffractive structure under the at least one specified condition in a fashion that a spectral distribution of the light within the optical wavefront is altered. As a result, a spectator who may look at the diffractive structure under the at least one specified condition without utilizing specially selected optical aids would be able see a portion of the modified optical wavefront showing the altered spectral distribution. As an alternative or in addition, a specifically designated optical sensor can be used for this purpose. As generally used, the term "optical sensor" refers to a type of sensor which is configured to receive optical information and to transform it into at least one electrical, electronic, optical or magnetic signal which could be evaluated for at least one further purpose. In particular, the optical sensor can specifically be designated to be able to perceive the at least one diffractive pattern.

In other words, an incident light beam impinging on the lens body outside the at least one diffractive pattern or on the least one diffractive pattern outside the at least one specified condition is transmitted without altering the spectral distribution of the light beam, whereas an incident light beam which impinges on the least one diffractive pattern under the at least one specified condition alters the spectral distribution of the light beam. As a result, a user of the at least one spectacle lens, or a spectator, such as an optician, looking at the user wearing the at least one spectacle lens without utilizing specially selected optical aids can be able to perceive, apart from the familiar effect of the refractive effect of the spectacle lens, either no alteration of the incident light beam or a characteristic alteration of the incident light beam, wherein the latter can be used for providing the desired information about the at least one location on the lens body and/or the at least one item of information related to the spectacle lens as described elsewhere herein in more detail.

Further, in order to arrange that the permanent markings may only be visible under the at least one specified condition, the at least one diffractive pattern can, preferably, be designated to be invisible upon a first kind of illumination of the spectacle lens and to be visible only upon a second kind of illumination of the spectacle lens. As used herein, the term "illumination" refers to electromagnetic radiation as defined below in more detail which is configured for impinging at least on the at least one permanent marking as comprised by the lens body of the spectacle lens. As further used herein, the terms "first" and "second" are considered as description without specifying an order and without excluding a possibility that other elements of the same kind may be present. As further used herein, the term "visible" refers to a property of the at least one diffractive pattern of being conceived by the at least one eye of a person. Similarly, the term "invisible" refers to a property of the at least one diffractive pattern of not being conceived by the at least one eye of a person, due to at least one of an intensity below a visibility threshold of the at least one eye of the user, or a propagation of a modified light beam as generated by the diffractive structure in a direction outside a field of vision by the at least one eye of the user. By way of example, although a portion of incident light passing through the diffractive structure may still propagate in an unaltered fashion on the same optical path, this portion of light may, however, be invisible to the at last one eye of the user due to the direction of propagation of the unaltered light beam.

As a result, the at least one permanent marking may remain invisible to the user wearing the at least one spectacle lens or to a spectator looking at the user wearing the at least one spectacle lens without utilizing specially selected optical aids but may become visible to the spectator, such as the optician, or to the specifically designated optical sensor if the at least one specified condition may be met, thus, enabling a continued control of the position of the at least one spectacle lens in front of the at least one eye of the user and/or retrieving at least one item of information related to the spectacle lens. As used herein, the term "specified condition" refers to at least one prerequisite which is to be met in order to generate visibility of the at last one diffractive pattern, in particular comprising at least one wavelength and/or at least one direction of the illumination of the diffractive structure as provided by the second kind of illumination. As an alternative, the at least one permanent marking may only become visible upon being viewed through at least one additional optical element, such as an optical filter. In other words, the eye of the spectator, such as the optician, or the specifically designated optical sensor may only be able to perceive the diffractive structure as long as the at least one additional optical element, such as the optical filter, may be inserted into an optical path between the lens body of the spectacle lens and the at least one eye of the spectator or the specifically designated optical sensor, respectively.

In an exemplary embodiment, the first kind of illumination of the spectacle lens may be provided by a large-bandwidth light source, whereas the second kind of illumination of the spectacle lens may be provided by a small-bandwidth light source. As generally used, the term "light source" refers to an arbitrary object which is designated for generating light. As used herein, the term "light" refers to electromagnetic radiation in at least one of the visual spectral region, the near-infrared spectral region, or the near-ultraviolet spectral region. As generally used, the term "visible spectral region" refers to electromagnetic radiation having a wavelength of 380 nm to 780 nm, whereas the term "near-infrared spectral region" relates to electromagnetic radiation having a wavelength above 780 nm to 1.5 µm, while the term "near-ultraviolet spectral region" refers to electromagnetic radiation having a wavelength of 200 nm to below 380 nm. Further, the term "bandwidth" relates to a wavelength range which can be provided by the light source. Consequently, the term "small bandwidth" refers to a wavelength range of at maximum 150 nm, preferably at maximum 100 nm, more preferred at maximum 50 nm, whereas the term "large bandwidth" refers to a wavelength range above 150 nm, preferably of at least 200 nm, more preferred of at least 400 nm.

Herein, the large-bandwidth light source may be selected from a natural light source or an artificial light source which is, typically, used for ordinary illumination purposes. As generally used, the term "natural light source" relates to a light source which is available without human impact and may, especially, comprise sunlight, either bright or dimmed by clouds, or moonlight. Further, the large-bandwidth artificial light source may, in particular, be selected from a white light-emitting diode, an energy-saving lamp, an incandescent lamp, or a gas-discharge lamp as long as this kind of light source has a large bandwidth and is, generally, available for being used for ordinary illumination purposes. As generally used, the term "white light-emitting diode" refers to a combination of at least two light-emitting diodes which are designated for generating a large bandwidth. In contrast hereto, the small-bandwidth light source may be selected from a small-bandwidth artificial light source, especially a laser light source, or a single light-emitting diode.

In a particular embodiment, the diffractive structures may be designated for generating a diffractive pattern which may be capable of meeting the at least one specified condition under illumination in at least one of a near-infrared spectral region and a near-ultraviolet spectral region rather than in the visual spectral region. In this particular embodiment, the small-bandwidth light source may be configured for generating light which comprises a fraction in at least one of a near-infrared spectral region and a near-ultraviolet spectral region which is diffracted by the diffraction pattern in a fashion that light in the visual spectral region is generated.

In general, the at least one diffractive structure can be designated to generate an arbitrary diffractive pattern which may be capable for being used for at least one purpose of the at least one permanent marking as described above or below.

In an exemplary embodiment, the at least one diffractive structure may, however, exhibit a reflection efficiency of 10% to 50%, preferably of 15% to 30%, upon impingement by the second kind of illumination. As a result, the overall reflection of the at least one diffractive structure can, thus, be reduced in order to contribute to an overall reduction of an intensity of the reflection of the incident light by the at least one diffractive structure.

In a further exemplary embodiment, the at least one specified condition may comprise an angle under which the incident light beam may impinge on the diffractive structure. As a result, the at least one diffractive structure can, thus, be designated for being visible only upon an angle of the second kind of illumination with respect to a surface of the spectacle lens of a maximum of 45°, preferably a maximum of 30°, more preferred a maximum of 15°.

In a further exemplary embodiment, the at least one specified condition may, alternatively or in addition, comprise an angle under which an emergent light beam may be generated by the diffractive structure upon illumination by the incident light beam. As a result, the at least one diffractive structure can, thus, be designated for generating the emergent light beam having an angle with respect to the surface of the spectacle lens of a maximum of 45°, preferably a maximum of 30°, more preferred a maximum of 15°, under which the diffractive pattern may be only visible using the second kind of illumination. In this fashion, the visibility of the diffractive pattern may, alternatively or in addition, be limited.

In a further exemplary embodiment, the at least one diffractive structure may be designated to generate at least one holographic pattern under the at least one specified condition. As generally used, the term "holographic pattern" refers to an interference pattern which can be re-produced by a three-dimensional light field which is illuminating a specifically generated diffraction pattern. However, further kinds of diffractive structures may also be feasible.

In a further aspect, the present disclosure relates to a method for producing a spectacle lens for at least one eye of a user as disclosed elsewhere herein. In particular, the method can be used for introducing at least one permanent marking into a lens body, wherein the at least one permanent marking may only be visible if at least one specified condition is met. The method according to the present disclosure comprises the following steps a) and b), which are, preferably, be performed in the given order commencing with step a) and continuing with step b), wherein, depending on the selected producing method, both steps may also at least partially be performed in a simultaneous manner. In addition, further steps, whether disclosed herein or not, may, additionally, be performed. The steps of the present method are as follows:

a) generating a spectacle lens based on instructions configured to compensate at least one ocular aberration of the at least one eye of the user; and
b) introducing at least one permanent marking into a lens body of the spectacle lens, wherein the at least one permanent marking is introduced into the lens body in a fashion that the at least one permanent marking is or comprises at least one diffractive structure.

According to step a), a spectacle lens based is generated based on instructions configured to compensate at least one ocular aberration of the at least one eye of the user. For this purpose, a lens blank may be provided which may, subsequently, be grinded in order to provide the desired compensation. Based on the Standard, 3.8.1, the term "lens blank" refers to a lenticular piece, wherein not more than one surface is an optical surface such that at least one further surface is grinded until the desired compensation is achieved. As an alternative, an additive technology designated to generate the lens body, such as a 3D printing technology, may be performed for this purpose.

According to step b), at least one permanent marking, wherein the at least one permanent marking may, preferably, be configured to provide information about at least one of a location on the lens body, an item of information related to the spectacle lens, or an item of information related to the at least one eye of the user, is introduced into the lens body of the spectacle lens. Herein, the lens body as generated during step a) may undergo an additional treatment which is designated for this purpose. Alternatively, the additive technology which may be designated to generate the lens body, such as a 3D printing technology, may, concurrently, be used for this purpose, in particular during the generation of the spectacle lens according to step a).

Herein, the at least one diffractive structure may be is generated by embedding a photosensitive layer into the lens body and illuminating the photosensitive layer. A generally used, the term "photosensitive layer" refers to an extended thin body having a structure which is designated to be modified by illumination, whereby the desired diffractive structures are obtained.

As an alternative, the at least one diffractive pattern may be generated by treating a surface of the spectacle lens by a surface treatment method selected from an additive technology or a subtractive technology. As generally used, the term "additive technology" refers to a process in which at least one additional substance is deposited on the lens body. As further generally used, the term "subtractive technology" refers to a process in which a portion of a material comprised by the lens body is removed.

As a further alternative the at least one diffractive pattern may be generated by modifying a refractive index within at least one volume element of the lens body. As used herein, the term "refractive index" refers to a grade by which incident light is refracted when entering the lens body or a portion thereof. Thus, modifying the refractive index within at least one volume element of the lens body may result in a desired diffraction of the incident light. For a purpose of modifying the refractive index, a chemical composition of the at least one volume element within the lens body may be modified, such as by ion exchange. However, further kinds of procedures may also be feasible.

In general, the method according to the present disclosure can be performed in a non-automatic fashion in a which a lens blank may be provided and, subsequently, be grinded, such as by using a grinding device, in order to provide the desired compensation of the at least one ocular aberration of the at least one eye of the user. However, in an exemplary embodiment, the method according to the present disclosure may be a computer-implemented method. As generally used, the term "computer-implemented method" refers to a method which involves a programmable apparatus, specifically a computer, a computer network, or a readable medium carrying a computer program, whereby at least one method step, preferably all method steps, is performed by using at least one computer program. For this purpose, the computer program code can be provided on a data storage medium or a separate device such as an optical storage medium, e.g., on a compact disc, directly on a computer or a data processing unit, in particular a mobile communication device, specifically a smartphone or a tablet, or via a network, such as an in-house network or the internet. The present method can, thus, being performed on a programmable unit which is configured for this purpose, such as by providing a particular computer program.

Thus, in a further aspect, the present disclosure refers to a computer program product which comprises executable instructions for performing the method for producing a spectacle lens according to the present disclosure. For this purpose, a computer program may comprise instructions provided by means of a computer program code which are capable of performing any or all of the steps of the method as described elsewhere herein and, thus, to produce a spectacle lens for at least one eye of a user when implemented on a computer or a data processing unit. Herein, the computer program code may be provided on a data storage medium or a separate device such as an optical storage medium, e.g., on a compact disc, directly on a computer or a data processing unit, in particular a mobile communication device, specifically a smartphone or a tablet, or via a network, such as an in-house network or the internet.

For further details concerning the method for producing the spectacle lens and the related computer program product, reference may be made to the spectacle lens as disclosed elsewhere herein.

The spectacle lens for at least one eye of a user, in particular the at least one single vison lens or the at least one progressive-power lens, the method for producing the spectacle lens and the related computer program product exhibit various advantages with respect to the prior art. In particular, the spectacle lens may, thus, comprise permanent markings which may be configured to provide the desired information about at least one location on the lens body and/or at least one item of information related to the spectacle lens and/or at least one item of information related to the at least one eye of the user only if at least one specified condition is met. In particular, the permanent markings on the spectacle lens may, on one hand, not be visible to the user or to a spectator looking at the user wearing the at least one spectacle lens without utilizing specially selected optical aids but may, on the other hand, enable a continued control of the position of the at least one spectacle lens in front of the at least one eye of the user by the optician or the specifically designated optical sensor. As a result, even in an event in which the user may have left the premises of the optician, thereby wearing the eye glasses that comprise the at least one single vison lens or the at least one progressive-power lens, and may have returned, hereby objecting a suboptimal vision as a result of wearing the new eye glasses, a control of the positioning of the eye glasses in front of the at least one eye of the user is still possible for the optician. Consequently, a satisfaction of a user with the at least one spectacle lens, especially the at least one single vison lens or the at least one progressive-power lens, can be considerably be improved, thus, contributing to an acceptance of the at least one spectacle lens, especially the at least one single vison lens or the at least one progressive-power lens, by the user.

Summarizing, the exemplary embodiments according to the following Clauses are particularly preferred within the scope of the present disclosure:

Clause 1: A spectacle lens for at least one eye of a user having a lens body, wherein the lens body comprises at least one permanent marking, wherein the at least one permanent marking is or comprises at least one diffractive structure.

Clause 2: The spectacle lens according to the preceding Clause, wherein at least one diffractive pattern generated by illumination of the diffractive structure is designated to be invisible upon a first kind of illumination.

Clause 3: The spectacle lens according to the preceding Clause, wherein the first kind of illumination of the spectacle lens is provided by a large-bandwidth light source.

Clause 4: The spectacle lens according to the preceding Clause, wherein the large-bandwidth light source is selected from a natural light source or an artificial light source used for ordinary illumination purposes.

Clause 5: The spectacle lens according to the preceding Clause, wherein the large-bandwidth light source is selected from a white light-emitting diode, an energy-saving lamp, an incandescent lamp, or a gas-discharge lamp.

Clause 6: The spectacle lens according to any one of the four preceding Clauses, wherein the at least one diffractive pattern generated by the illumination of the diffractive structure is designated to be visible only upon a second kind of illumination.

Clause 7: The spectacle lens according to the preceding Clause, wherein a visibility of the at least one diffractive pattern upon a second kind of illumination comprises a property of the at least one diffractive pattern of being conceived by the at least one eye of a person.

Clause 8: The spectacle lens according to any one of the two preceding Clauses, wherein the second kind of illumination of the spectacle lens is provided by a small-bandwidth light source.

Clause 9: The spectacle lens according to the preceding Clause, wherein the small-bandwidth light source comprises a spectral band having a wavelength range of at maximum 150 nm, preferably at maximum 100 nm, more preferred at maximum 50 nm.

Clause 10: The spectacle lens according to the preceding Clause, wherein the small-bandwidth light source is selected from a laser light source, or a single light-emitting diode.

Clause 11: The spectacle lens according to any one of the two preceding Clauses, wherein the small-bandwidth light source is configured for generating light in at least one of: a near-infrared spectral region and a near-ultraviolet spectral region.

Clause 12: The spectacle lens according to any one of the six preceding Clauses, wherein the at least one diffractive structure exhibits a reflection efficiency of 10% to 50%, preferred of 15% to 30%, upon the second kind of illumination of the spectacle lens.

Clause 13: The spectacle lens according to any one of the seven preceding Clauses, wherein the at least one diffractive structure is designated for being visible only upon an angle of the second kind of illumination with respect to a surface of the spectacle lens of a maximum of 45°, preferably a maximum of 30°, more preferred a maximum of 15°.

Clause 14: The spectacle lens according to any one of the eight preceding Clauses, wherein the at least one diffractive structure is designated for generating an emergent light beam having an angle with respect to a surface of the spectacle lens of a maximum of 45°, preferably a maximum of 30°, more preferred a maximum of 15°, only upon using the second kind of illumination.

Clause 15: The spectacle lens according to any one of the nine preceding Clauses, wherein the at least one diffractive structure is designated to be visible only upon being viewed through at least one additional optical element.

Clause 16: The spectacle lens according to any one of the ten preceding Clauses, wherein the at least one diffractive structure is designated to be visible by at least one of: a spectator or a specifically designated optical sensor.

Clause 17: The spectacle lens according to any one of the eleven preceding claims, wherein the at least one diffractive structure is designated to generate at least one holographic pattern upon the second kind of illumination of the spectacle lens.

Clause 18: The spectacle lens according to any one of the preceding Clauses, wherein the at least one permanent marking is a marking comprised by the lens body which is capable of being removed only by exertion of a considerable force able to damage the spectacle lens.

Clause 19: The spectacle lens according to any one of the preceding Clauses, wherein the at least one permanent marking is configured to provide information about at least one of: a location on the lens body, an item of information related to the spectacle lens, or an item of information related to the at least one eye of the user.

Clause 20: The spectacle lens according to the preceding Clause, wherein the location is a two-dimensional position on a surface of the lens body or a three-dimensional position within the lens body.

Clause 21: The spectacle lens according to any one of the two preceding Clauses, wherein the information about the location on the lens body is selected from at least one of: a distance reference point, at least one near reference point, a fitting cross, a prism reference point, an alignment reference marking.

Clause 22: The spectacle lens according to any one of the three preceding Clauses, wherein the item of information related to the spectacle lens is selected from at last one of: an indication of at least one of: a power, a type, a manufacturer, or a supplier of the spectacle lens, or a tradename or a trademark related to the spectacle lens.

Clause 23: The spectacle lens according to any one of the four preceding Clauses, wherein the item of information related to the at least one eye of the user is selected from at least one of: an ocular aberration, in particular at least one refractive error; a direction of view; a corneal vertex distance; or a pupillary distance.

Clause 24: The spectacle lens according to any one of the preceding Clauses, wherein the at least one diffractive structure is a volume element comprised by the lens body which occupies at maximum 2%, preferably 1%, more preferred 0.5%, of a volume of the lens body.

Clause 25: The spectacle lens according to any one of the preceding Clauses, wherein the lens body is transparent or at least partly transparent to incident light.

Clause 26: The spectacle lens according to any one of the preceding Clauses, wherein the spectacle lens is a single vison lens or a progressive-power lens.

Clause 27: A method for producing a spectacle lens, comprising the following steps:
  a) generating a spectacle lens based on instructions configured to compensate at least one ocular aberration of the at least one eye of the user; and
  b) introducing at least one permanent marking into a lens body of the spectacle lens,
wherein the at least one permanent marking is introduced into the lens body in a fashion that the at least one permanent marking is or comprises at least one diffractive structure.

Clause 28: The method according to any one of the preceding Clauses referring to a method, wherein the at least one diffractive pattern is generated by embedding a photosensitive layer into the lens body and illuminating the photosensitive layer.

Clause 29: The method according to any one of the preceding Clauses referring to a method, wherein the at least one diffractive pattern is generated by treating a surface of the lens body by a surface treatment method selected from an additive technology or a subtractive technology.

Clause 30: The method according to any one of the preceding Clauses referring to a method, wherein the at least one diffractive pattern is generated by modifying a refractive index within at least one volume element of the lens body.

Clause 31: A computer program product comprising executable instructions for performing a method for producing a spectacle lens for at least one eye of a user, wherein the method comprises the steps of the method according to any one of the preceding Clauses referring to a method.

BRIEF DESCRIPTION OF THE DRAWINGS

Further optional features and embodiments of the present disclosure are disclosed in more detail in the subsequent description of preferred embodiments, preferably in conjunction with the dependent claims. Therein, the respective optional features may be implemented in an isolated fashion as well as in any arbitrary feasible combination, as the skilled person will realize. It is emphasized here that the scope of the disclosure is not restricted by the preferred embodiments.

The disclosure will now be described with reference to the drawings wherein.

DESCRIPTION OF EXEMPLARY EMBODIMENTS

Figure 1:
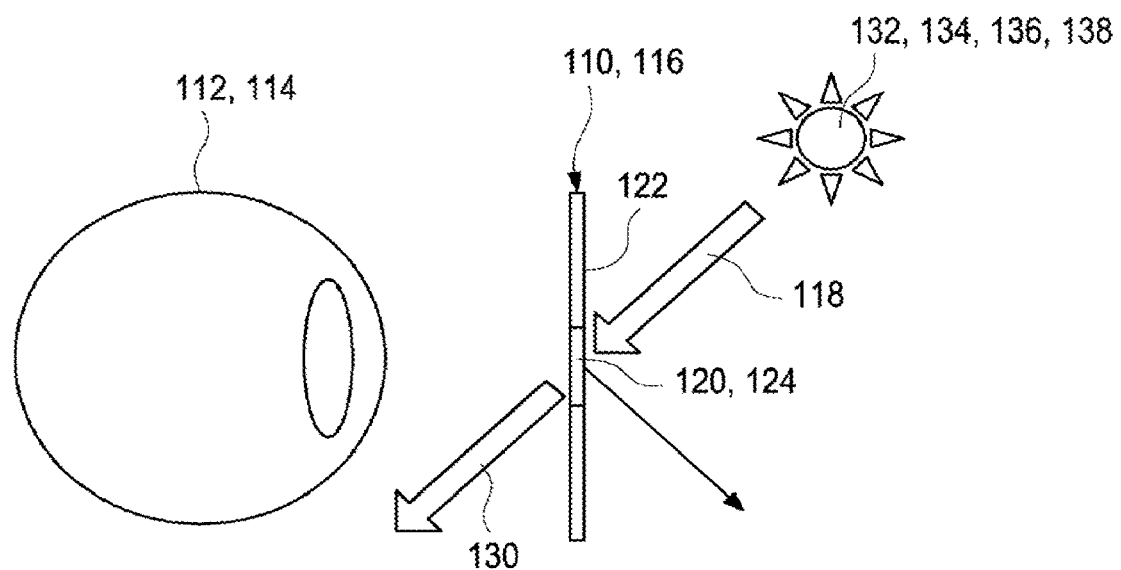
FIG. 1 illustrates an exemplary embodiment of a spectacle lens for at least one eye of a user under a first kind of illumination.
Figure 2:
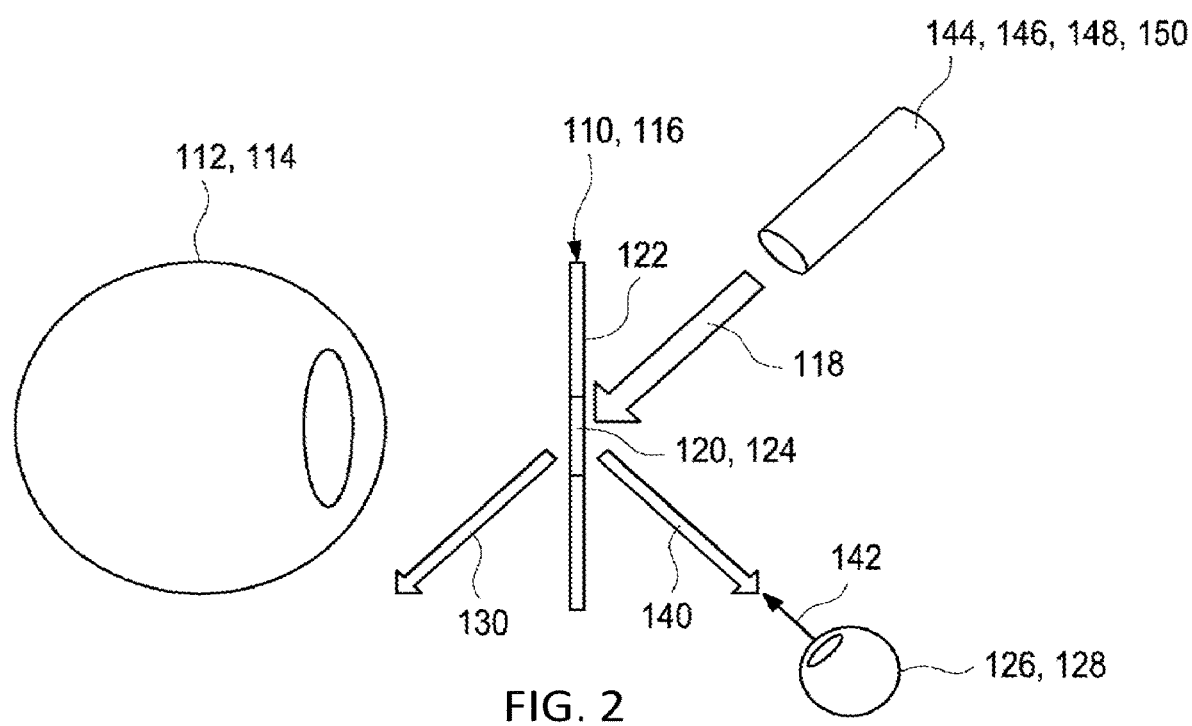
FIG. 2 illustrates the preferred embodiment of the spectacle lens for the at least one eye of the user under a second kind of illumination.

FIGS. 1 and 2 each illustrates an exemplary embodiment of a spectacle lens 110 for at least one eye 112 of a user 114. In the following, the figures and the description thereof refer, for sake of simplicity, however, only to one of the eyes 112 of the user 114. In particular, the spectacle lens 110 may be a single vison lens or, alternatively, a progressive-power lens, which is a power-variation lens having two reference points for focal power and which is, generally, designed to provide correction for presbyopia and clear vision from distance to near. For further details on the progressive-power, reference can be made to the description above.

The spectacle lens 110 has a lens body 116 which may be transparent or at least partly transparent to an incident light beam 118 in order to be able to correct at least one ocular aberration of the eye 112 of the user 114. As schematically depicted in FIGS. 1 and 2, the lens body 116 comprises a permanent marking 120 which corresponds to a two-dimensional structure on a surface 122 of the lens body 116, or a three-dimensional structure within the lens body 116. Although FIGS. 1 and 2 only show a single permanent marking 120, the lens body 116 may, in general, comprise more than one permanent marking 120 for purposes as described above or below in more detail. In particular contrast to a temporary marking (not depicted here) which may also be placed on the surface 122 of the lens body 116 and which, typically, comprises non-permanent ink and can, thus, easily, be removed by applying a soft force not being sufficiently large to damage the spectacle lens 110, the permanent marking 120 is capable to be removed from the optical lens 110 only by exertion of a considerable force able to damage the spectacle lens 110.

In particular, each permanent marking 120 may be a volume element that is comprised by the lens body 116 and which may occupy at maximum 2%, preferably at maximum 1%, more preferred at maximum 0.5% of a volume of the lens body 116. Especially owing to the transparency or to the partial transparency of the lens body 116, each permanent marking 120 can, in principle, be placed at any location within the lens body 116 or at the surface 122 or below the surface 122 of the lens body 116.

As described above in more detail, each permanent marking 120 may, preferably, be configured to provide information about one or more locations on the lens body 116, about one or more items of information related to the spectacle lens 110, or about one or more items of information related to the eye 112 of the user 114. Herein, the information about the one or more locations on the lens body 116, which can, in particular, be used for controlling a position of the spectacle lens 110 in front of the eye 112 of the user 114 by an optician, may, preferably, comprise at least one of: a distance reference point (DRP); at least one near reference point (NRP); a fitting cross (FC); a prism reference point (PRP); an alignment reference marking. However, information about further kinds of locations may be feasible. Further, the one or more items of information which are related to the spectacle lens 110 may, preferably, comprise at least one of: a power, a type, a manufacturer, or a supplier of the spectacle lens 110; a tradename or a trademark related to the spectacle lens 110. However, other items of information that are related to the spectacle lens 110 may be also comprised by the permanent marking 120. Further, the one or more items of information which may be related to the at least one eye 112 of the user 114 may, preferably, be comprise at least one of: an ocular aberration, in particular at least one refractive error; a direction of view; a corneal vertex distance; or a pupillary distance. However, other items of information related to the at least one eye 112 of the user 114 may also be comprised by the at least one permanent marking 120.

In accordance with the present disclosure, the permanent marking 120 is or comprises a diffractive structure 124. As indicated above, the diffractive structure 124 refers to a two-dimensional structure on the surface 122 of the lens body 116 or to a three-dimensional structure within the lens body 110, wherein the structure is configured to generate a diffractive pattern (not depicted here) provided that (i) the incident light beam 118 impinges on the diffractive structure 124 and (ii) at least one specified condition is met. Herein, the diffractive pattern can be any kind of diffractive pattern including but not limited to a holographic pattern.

As illustrated there, FIG. 1 shows a first situation in which the at least one specified condition is not met. Although the permanent marking 120 is or comprises the diffractive structure 124, it can, thus, not generate the diffractive pattern. As a result, the incident light beam 118 passes the permanent marking 120 being or comprising the diffractive structure 124 in an unaltered fashion as indicated by the arrow 130. Consequently, the permanent marking 120 may remain invisible to the eye 112 of the user 114 of the spectacle lens 110 and may also be invisible to an eye 126 of a spectator 128, such as an optician, looking at the diffractive structure 124 in the spectacle lens 110 the user 114 is wearing without utilizing specially selected optical aids as schematically depicted in FIG. 2. As an alternative (not depicted here), a specifically designated optical sensor may be used for perceiving the diffractive structure 124 in the spectacle lens 110.

Herein, the first situation in which the at least one specified condition is not met, can be implemented by using a first kind of illumination 132 which illuminates the spectacle lens 110. As further illustrated in FIG. 1, the first kind of illumination 132 can, preferably, be provided by a large-bandwidth light source 134, in particular a natural light source 136, such as the sun 138. As an alternative (not depicted here), an artificial light source which is, typically, used for ordinary illumination purposes can also be used. Herein, artificial large-bandwidth light source 134 may, particularly, selected from a white light-emitting diode, an energy-saving lamp, an incandescent lamp, or a gas-discharge lamp as long as this kind of light source has a large bandwidth and is, generally, available for ordinary illumination purposes.

In contrast hereto, FIG. 2 illustrates a second situation in which the at least one specified condition is met. Herein, the permanent marking 120 which is or comprises the diffractive structure 124, can, thus, generate the desired diffractive pattern. As a result, the incident light beam 118 which impinges on the diffractive structure 124 as comprised by the permanent marking 120 is altered by the diffractive structure 124 in a fashion that an additional light beam 140, also denoted as "emergent light beam," is generated while a portion of the incident light 118 may still propagate in an unaltered fashion on the same optical path as indicated in FIGS. 1 and 2 by the arrow 130. Consequently, while the permanent marking 120 may remain invisible to the eye 112 of the user 114 of the spectacle lens 110 because the light beam indicated by the arrow 130 does not met the eye 112 of the user 114, it may become visible to the eye 126 of the spectator 128, such as the optician, who looks from a particularly selected direction 142 of view at the diffractive structure 124 as comprised by the lens body 116 of the spectacle lens 110. In a particular embodiment (not depicted here), the permanent marking 120 may only become visible to the eye 126 of the spectator 128, such as the optician, who looks at the diffractive structure 124 as long as he may insert at least one further optical element, such as an optical filter, into an optical path between the lens body 116 of the spectacle lens 110 and the at least one eye 126 of the spectator 128. As indicated above, the specifically designated optical sensor may, alternatively, be used for perceiving the diffractive structure 124 in the spectacle lens 110. As further illustrated in FIG. 2, the diffractive structure 124 may be designated for being visible only upon an angle of the second kind of illumination 132 with respect to the surface 122 of the spectacle lens 110 of a maximum of 45°, preferably a maximum of 30°, more preferred a maximum of 15°. As further illustrated in FIG. 2, the diffractive structure 124 may be designated in a manner that the emergent light beam 140 may have an angle with respect to the surface 122 of the spectacle lens 110 of a maximum of 45°, preferably a maximum of 30°, more preferred a maximum of 15°, specifically in order to, further, limit the visibility of the diffractive pattern in this fashion. Although FIG. 2 may suggest that the user 114 is actually wearing the spectacle lens 110, the visibility of the diffractive pattern is not affected hereby and would also occur if the user 114 does not wear the spectacle lens 110.

Herein, the second situation in which the at least one specified condition is met, can be implemented by using a second kind of illumination 144 which illuminates the spectacle lens 110. As further illustrated in FIG. 2, the second kind of illumination 144 can, preferably, be provided by a small-bandwidth light source 146, which may, preferably, be selected from a small-bandwidth artificial light source, especially a laser light source 148, or a single light-emitting diode 150. Herein, the small-bandwidth light source 146 may, especially, comprise a spectral band having a wavelength range of at maximum 150 nm, preferably at maximum 100 nm, more preferred at maximum 50 nm.

In particular, by adjusting the second kind of illumination 144 to the diffractive structure 124 in the spectacle lens 110, an intensity of the light beam indicated by the arrow 130 which passes through the diffractive structure 124 in an otherwise unaltered fashion can be decreased, preferably below a visibility threshold of the eye 112 of the user 114. In order to increase a difference between the invisibility and the visibility of the diffractive pattern, the diffractive structure 124 may exhibit a reflection efficiency of only 10% to 50%, preferred of 15% to 30%, upon the second kind of illumination 144 of the spectacle lens 110. Alternatively or in addition, the small-bandwidth light source 146 may be configured for generating light in at least one of a near-infrared spectral region and a near-ultraviolet spectral region in order to further reduce visibility of the diffractive pattern in the visual spectral region.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 110 spectacle lens
112 eye
114 user
116 lens body
118 incident light beam
120 permanent marking
122 surface
124 diffractive structure
126 eye
128 spectator (optician)
130 arrow
132 first kind of illumination
134 large-bandwidth light source
136 natural light source
138 sun
140 additional light beam (emergent light beam)
142 direction of view
144 second kind of illumination
146 small-bandwidth light source
148 laser light source
150 single light-emitting diode

The invention claimed is:

1. A spectacle lens for at least one eye of a user, the spectacle lens comprising:
   a lens body having at least one permanent marking, wherein the at least one permanent marking is or contains at least one diffractive structure, wherein at least one diffractive pattern generated by illumination of the diffractive structure is configured to be invisible upon a first kind of illumination and configured to be visible only upon a second kind of illumination, wherein being visible is a property of the at least one diffractive pattern of being perceived by the at least one eye of the user, and wherein being invisible is a property of the at least one diffractive pattern of not being perceived by the at least one eye of the user,
   wherein the at least one diffractive pattern is configured to be visible only under illumination in at least one of a near-infrared spectral region and a near-ultraviolet spectral region, wherein the at least one permanent marking is configured to provide information about at least one of a location on the lens body, and wherein the information about the at least one location on the lens body is selected from at least one of:
      a distance reference point;
      at least one near reference point;
      a fitting cross;
      a prism reference point; and
      an alignment reference marking.

2. The spectacle lens according to claim 1, wherein the first kind of illumination of the spectacle lens is provided by a large-bandwidth light source, and wherein the large-bandwidth light source has a wavelength range above 150 nm.

3. The spectacle lens according to claim 2, wherein the large-bandwidth light source is selected from a natural light source or an artificial light source used for ordinary illumination purposes.

4. The spectacle lens according to claim 1, wherein the second kind of illumination of the spectacle lens is provided by a small-bandwidth light source, and wherein the small-bandwidth light source has a wavelength range of at maximum 150 nm.

5. The spectacle lens according to claim 4, wherein the small-bandwidth light source comprises a spectral band having a wavelength range of at maximum 150 nm.

6. The spectacle lens according to claim 4, wherein the small-bandwidth light source is configured to generate light in at least one of a near-infrared spectral region and a near-ultraviolet spectral region.

7. The spectacle lens according to claim 1, wherein the at least one diffractive pattern is configured to being visible only upon illumination an angle of the second kind of illumination with respect to a surface of the spectacle lens of at a maximum of 45° and/or upon being viewed through at least one further optical element.

8. The spectacle lens according to claim 1, wherein the at least one diffractive structure is configured to generate at least one holographic pattern upon illumination with the second kind of illumination of the spectacle lens.

9. The spectacle lens according to claim 1, wherein the at least one permanent marking is configured to provide information about an item of information related to the spectacle lens, or an item of information related to the at least one eye of the user.

10. The spectacle lens according to claim 1, wherein the at least one diffractive structure is a volume element comprised by the lens body which occupies at maximum 2% of a volume of the lens body.

11. A method for producing a spectacle lens for at least one eye of a user, the method comprising:
   a) generating a spectacle lens based on instructions configured to compensate at least one ocular aberration of the at least one eye of the user; and
   b) introducing at least one permanent marking into a lens body of the spectacle lens,
      wherein the at least one permanent marking is introduced into the lens body such that the at least one permanent marking is or contains at least one diffractive structure, wherein at least one diffractive pattern generated by illumination of the diffractive structure is configured to be invisible upon a first kind of illumination and configured to be visible only upon a second kind of illumination, wherein being visible is a property of the at least one diffractive pattern of being perceived by the at least one eye of the user, and wherein being invisible is a property of the at least one diffractive pattern of not being perceived by the at least one eye of the user,
      wherein the at least one diffractive pattern is configured to be visible only under illumination in at least one of a near-infrared spectral region and a near-ultraviolet spectral region, wherein the at least one permanent marking is configured to provide information about at least one of a location on the lens body, wherein the information about the at least one location on the lens body is selected from at least one of:
         a distance reference point;
         at least one near reference point;
         a fitting cross;
         a prism reference point; and
         an alignment reference marking.

12. The method according to claim 11, wherein the at least one diffractive structure is generated by at least one of:
   embedding a photosensitive layer into the lens body and illuminating the photosensitive layer;
   treating a surface of the lens body by a surface treatment method selected from an additive technology or a subtractive technology; and
   modifying a refractive index within at least one volume element of the lens body.

13. A computer program stored on a non-transitory storage medium and having executable instructions for performing a method for producing a spectacle lens for at least one eye of a user, the method comprising:
   a) generating a spectacle lens based on instructions configured to compensate at least one ocular aberration of the at least one eye of the user; and
   b) introducing at least one permanent marking into a lens body of the spectacle lens,
      wherein the at least one permanent marking is introduced into the lens body such that the at least one permanent marking is or contains at least one diffractive structure, wherein at least one diffractive pattern generated by illumination of the diffractive structure is configured to be invisible upon a first kind of illumination and configured to be visible only upon a second kind of illumination, wherein being visible is a property of the at least one diffractive pattern of being perceived by the at least one eye of the user, and wherein being invisible is a property of the at least one diffractive pattern of not being perceived by the at least one eye of the user, wherein the at least one diffractive pattern is configured to be visible only under illumination in at least one of a near-infrared spectral region and a near-ultraviolet spectral region, wherein the at least one permanent marking is configured to provide information about at least one of a location on the lens body, and wherein the information about the at least one location on the lens body is selected from at least one of:

a distance reference point;
at least one near reference point;
a fitting cross;
a prism reference point; and
an alignment reference marking.

14. A spectacle lens for at least one eye of a user, the spectacle lens comprising:

a lens body having at least one permanent marking, wherein the at least one permanent marking is or contains at least one diffractive structure, wherein at least one diffractive pattern generated by illumination of the diffractive structure is configured to be invisible upon a first kind of illumination and configured to be visible only upon a second kind of illumination, wherein being visible is a property of the at least one diffractive pattern of being perceived by the at least one eye of the user, and wherein being invisible is a property of the at least one diffractive pattern of not being perceived by the at least one eye of the user, wherein the at least one diffractive pattern is configured to be visible only under illumination in at least one of a near-infrared spectral region and a near-ultraviolet spectral region, wherein the at least one permanent marking is configured to provide information about at least one of a location on the lens body, wherein the information about the at least one location on the lens body is selected from at least one of:

a distance reference point;
at least one near reference point;
a fitting cross;
a prism reference point; and
an alignment reference marking, and wherein an incident light beam not containing at least one wavelength in at least one of a near-infrared spectral region and a near-ultraviolet spectral region impinging on the lens body outside the at least one diffractive pattern or on the least one diffractive pattern is transmitted without altering a spectral distribution of the light beam, whereas an incident light beam containing at least one wavelength in at least one of a near-infrared spectral region and a near-ultraviolet spectral region which impinges on the least one diffractive pattern alters the spectral distribution of the light beam.

15. The spectacle lens according to claim 14, wherein the first kind of illumination of the spectacle lens is provided by a large-bandwidth light source, wherein the large-bandwidth light source has a wavelength range above 150 nm.

16. The spectacle lens according to claim 15, wherein the large-bandwidth light source is selected from a natural light source or an artificial light source used for ordinary illumination purposes.

17. The spectacle lens according to claim 14, wherein the second kind of illumination of the spectacle lens is provided by a small-bandwidth light source, wherein the small-bandwidth light source has a wavelength range of at maximum 150 nm.

18. The spectacle lens according to claim 17, wherein the small-bandwidth light source comprises a spectral band having a wavelength range of at maximum 150 nm.

19. The spectacle lens according to claim 17, wherein the small-bandwidth light source is configured to generate light in at least one of a near-infrared spectral region and a near-ultraviolet spectral region.

20. The spectacle lens according to claim 14, wherein the at least one diffractive pattern is configured to be visible only upon illumination at an angle of the second kind of illumination with respect to a surface of the spectacle lens of a maximum of 45° and/or upon being viewed through at least one further optical element.

21. The spectacle lens according to claim 14, wherein the at least one diffractive structure is configured to generate at least one holographic pattern upon the second kind of illumination of the spectacle lens.

22. The spectacle lens according to claim 14, wherein the at least one permanent marking is configured to provide information about an item of information related to the spectacle lens, or an item of information related to the at least one eye of the user.

23. The spectacle lens according to claim 14, wherein the at least one diffractive structure is a volume element comprised by the lens body which occupies at maximum 2% of a volume of the lens body.

24. A method for producing a spectacle lens for at least one eye of a user, the method comprising:

a) generating a spectacle lens based on instructions configured to compensate at least one ocular aberration of the at least one eye of the user; and b) introducing at least one permanent marking into a lens body of the spectacle lens, wherein the at least one permanent marking is introduced into the lens body such that the at least one permanent marking is or contains at least one diffractive structure, wherein at least one diffractive pattern generated by illumination of the diffractive structure is configured to be invisible upon a first kind of illumination and configured to be visible only upon a second kind of illumination, wherein being visible is a property of the at least one diffractive pattern of being perceived by the at least one eye of the user, and wherein being invisible is a property of the at least one diffractive pattern of not being perceived by the at least one eye of the user, wherein the at least one diffractive pattern is configured to be visible only under illumination in at least one of a near-infrared spectral region and a near-ultraviolet spectral region, wherein the at least one permanent marking is configured to provide information about at least one of a location on the lens body, wherein the information about the at least one location on the lens body is selected from at least one of:

a distance reference point;
at least one near reference point;
a fitting cross;
a prism reference point; and
an alignment reference marking, and wherein an incident light beam not containing at least one wavelength in at least one of a near-infrared spectral region and a near-ultraviolet spectral region impinging on the lens body outside the at least one diffractive pattern or on the least one diffractive pattern is transmitted without altering a spectral distribution of the light beam, whereas an incident light beam containing at least one wavelength in at least one of a near-infrared spectral region and a near-ultraviolet spectral region which impinges on the least one diffractive pattern alters the spectral distribution of the light beam.

25. The method according to claim 24, wherein the at least one diffractive structure is generated by at least one of:
   embedding a photosensitive layer into the lens body and illuminating the photosensitive layer;
   treating a surface of the lens body by a surface treatment method selected from an additive technology or a subtractive technology; and
   modifying a refractive index within at least one volume element of the lens body.

26. A computer program product having executable instructions for performing a method for producing a spectacle lens for at least one eye of a user, the method comprising:
   a) generating a spectacle lens based on instructions configured to compensate at least one ocular aberration of the at least one eye of the user; and
   b) introducing at least one permanent marking into a lens body of the spectacle lens,
      wherein the at least one permanent marking is introduced into the lens body such that the at least one permanent marking is or contains at least one diffractive structure, wherein at least one diffractive pattern generated by illumination of the diffractive structure is configured to be invisible upon a first kind of illumination and configured to be visible only upon a second kind of illumination, wherein being visible is a property of the at least one diffractive pattern of being perceived by the at least one eye of the user, and wherein being invisible is a property of the at least one diffractive pattern of not being perceived by the at least one eye of the user,
      wherein the at least one diffractive pattern is configured to be visible only under illumination in at least one of a near-infrared spectral region and a near-ultraviolet spectral region, wherein the at least one permanent marking is configured to provide information about at least one of a location on the lens body, wherein the information about the at least one location on the lens body is selected from at least one of:
      a distance reference point;
      at least one near reference point;
      a fitting cross;
      a prism reference point; and
      an alignment reference marking,
   and wherein an incident light beam not containing at least one wavelength in at least one of a near-infrared spectral region and a near-ultraviolet spectral region impinging on the lens body outside the at least one diffractive pattern or on the least one diffractive pattern is transmitted without altering a spectral distribution of the light beam, whereas an incident light beam containing at least one wavelength in at least one of a near-infrared spectral region and a near-ultraviolet spectral region which impinges on the least one diffractive pattern alters the spectral distribution of the light beam.

* * * * *

UNITED STATES PATENT AND TRADEMARK OFFICE
CERTIFICATE OF CORRECTION

| | |
|---|---|
| PATENT NO. | : 11,906,820 B2 |
| APPLICATION NO. | : 18/191053 |
| DATED | : February 20, 2024 |
| INVENTOR(S) | : Katharina Rifai, Siegfried Wahl and Timo Kratzer |

It is certified that error appears in the above-identified patent and that said Letters Patent is hereby corrected as shown below:

In the Specification

In Column 5, Line 48: change "Homer" to -- Horner --

Signed and Sealed this
Nineteenth Day of March, 2024

Katherine Kelly Vidal
*Director of the United States Patent and Trademark Office*